United States Patent
An et al.

(10) Patent No.: US 7,745,034 B2
(45) Date of Patent: Jun. 29, 2010

(54) FUEL CELL SYSTEM AND FUEL CARTRIDGE HAVING FUEL BUFFER MODULE

(75) Inventors: Seong-jin An, Suwon-si (KR);
Yeong-chan Eun, Suwon-si (KR);
Gill-tae Roh, Suwon-si (KR); Seok-rak Chang, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 2 days.

(21) Appl. No.: 12/130,799

(22) Filed: May 30, 2008

(65) Prior Publication Data
US 2009/0011317 A1    Jan. 8, 2009

(30) Foreign Application Priority Data
Jul. 3, 2007    (KR) ............ 10-2007-0066513

(51) Int. Cl.
*H01M 8/04*    (2006.01)
*H01M 8/10*    (2006.01)
(52) U.S. Cl. .............................. 429/34; 429/30
(58) Field of Classification Search ........... 137/593; 222/105, 143, 207, 386.5, 445; 429/30, 34
See application file for complete search history.

(56) References Cited

U.S. PATENT DOCUMENTS 5,105,858 A * 4/1992 Levinson ............... 141/2
7,241,523 B1 * 7/2007 Arikara et al. .......... 429/25
2004/0164093 A1 * 8/2004 Redman et al. ......... 222/95
2006/0024553 A1 * 2/2006 Kaye et al. .............. 429/34

FOREIGN PATENT DOCUMENTS

| JP | 2005-203146 | 7/2005 |
| JP | 2005-235575 | 9/2005 |
| JP | 2005-317250 | 11/2005 |
| KR | 1020030078974 | 10/2003 |
| KR | 1020030078975 | 10/2003 |

* cited by examiner

*Primary Examiner*—Jerry Lorengo
*Assistant Examiner*—Jared Wood
(74) *Attorney, Agent, or Firm*—Knobbe, Martens, Olson & Bear LLP

(57) ABSTRACT

Disclosed is a fuel cartridge. The fuel cartridge according to the present disclosure comprises a fuel container having a first port configured to flow fuel therethrough; and a buffer module configured to be coupled to the fuel container, wherein the buffer module comprises a second port configured to engage with the first port, a tubing connection comprising a first and a second end, wherein the first end is coupled to or forms the second port, a third port coupled to or formed by the second end of the tubing connection, and a buffer container in fluid communication with the second and third ports via the tubing connection, wherein the buffer container is configured to store fuel therein when an inflow of the fuel to the buffer module is greater than an outflow from the buffer module.

22 Claims, 4 Drawing Sheets

FUEL CELL SYSTEM AND FUEL CARTRIDGE HAVING FUEL BUFFER MODULE

CROSS-REFERENCE TO RELATED APPLICATION

This application claims priority to and the benefit of Korean Patent Application No. 10-2007-0066513, filed on Jul. 3, 2007, in the Korean Intellectual Property Office, the entire content of which is incorporated herein by reference in its entirety.

BACKGROUND

1. Field

The present disclosure relates to a fuel cartridge having a buffer for the purpose of continuous operation of a fuel cell, and a fuel cell using the same.

2. Description of Related Art

A fuel cell is an electric generation system that directly converts energy stored in fuel to an electrical energy, and it has advantages in regard to low environmental pollutions and high efficiency. In particular, the fuel cell has come into the spotlight as a next-generation energy source since it generates electrical energy using an energy source such petroleum, natural gases, and methanol, which are easily stored and transported.

The fuel cell may be divided into a phosphoric acid fuel cell (PAFC), a molten carbonate fuel cell (MCFC), a solid oxide fuel cell (SOFC), a polymer electrolyte membrane fuel cell (PEMFC), an alkaline fuel cell (AFC), and the like, depending on the kinds of electrolytes used. Each of these fuel cells is basically operated in the same operation system, but the kind of fuel used, the operation temperature, the catalysts, and the electrolytes differ in each of these fuel cells.

A direct methanol fuel cell (DMFC) is configured so that a polymer membrane that transfers hydrogen ions (protons) can be used as an electrolyte and a liquid methanol solution directly supplied to an anode as the fuel. The DMFC may be manufactured with a stack structure in which a plurality of single cells is structurally or electrically coupled to each other. The DMFC is suitable for portable or small fuel cells since it dose not use a fuel reformer and is operated at an operation temperature of less than 100° C.

Meanwhile, in the case of a polymer electrolyte membrane fuel cell or the direct methanol fuel cell, a fuel cartridge should be exchanged with a new one for continuous operation of the fuel cell when the fuel stored in the fuel cartridge is nearly exhausted. While exchanging the fuel cartridge, the fuel cell may be unstable due to the suspension supply of fuel, and therefore the operation of the fuel cell is suspended when the fuel cartridge is being exchanged.

However, electronic equipment or electrical equipment using the fuel cell as a power source incurs problems when the operation is suspended during the time of exchanging a fuel cartridge. In particular, an uninterrupted supply of power source is required in the electronic equipment that should be continuously operated, and therefore there is a need for a fuel cell capable of continuously supplying electric energy.

SUMMARY OF THE INVENTION

Accordingly, an embodiment of the present disclosure provides a fuel cartridge having a structure capable of providing continuous and stable operation conditions of a fuel cell by providing continuous fuel supply while exchanging fuel cartridge.

Another embodiment of the present disclosure provides a fuel cell housing having a structure capable of enabling continuous fuel supply while exchanging a fuel cartridge. One of the embodiments of the present disclosure provides a fuel cartridge comprised of a fuel container having a first port for configured to flow fuel therethrough. And a buffer module configured to be coupled to the fuel container, wherein the buffer module comprises a second port configured to engage with the first port; a tubing connection comprising a first and second end, wherein the first end is coupled to or forms the second port and the second end is coupled to or forms the third port. The buffer module further comprises a buffer container in fluid communication with the second and third ports via the tubing connection, wherein the buffer container is configured to store fuel therein when an inflow of the fuel to the buffer module is greater than an outflow from the buffer module. The buffer container may be configured to release the stored fuel therein when an outflow of the fuel from the buffer module is greater than an inflow to the buffer module.

The tubing connection may further comprise a tube with at least one opening coupled with and in fluid communication with the buffer container. The tubing connection may further comprise a first tube in fluid communication between the second port and a port of the buffer container, and a second tube in fluid communication between the third port and another port of the buffer container.

The first port and the second port may be configured to open when they are coupled with each other and close when they are decoupled. The buffer module may have a rigid buffer module housing enclosing the buffer container or may comprise a rigid housing enclosing the fuel container and the buffer module.

The buffer container further comprises a flexible bag, wherein the buffer container is configured to change a fuel containing volume thereof. The fuel containing volume of the buffer container increases when an inflow of the fuel to the buffer module is greater than an outflow from the buffer module. The fuel containing volume of the buffer container decreases when an outflow of the fuel from the buffer module is greater than an inflow to the buffer module.

Another embodiment of the present disclosure provides a fuel cell comprising a fuel cell stack having an anode, a cathode and an electrolyte arranged between the anode and the cathode; and the fuel cartridge mentioned above for supplying fuel to the fuel cell stack Still another embodiment of present disclosure comprises a fuel cell device comprising a fuel cell stack having an anode, a cathode and an electrolyte arranged between the anode and the cathode; a fuel buffer; a fuel cell housing enclosing both the fuel cell stack and the fuel buffer module, the fuel cell housing comprising a port configured to engage with an external fuel supply container. The fuel buffer further comprises a buffer container configured to store fuel and supply the stored fuel to the fuel cell stack, and a tubing connection providing fluid communication among the port of the housing, the buffer container and the fuel cell stack. The buffer container may comprise of a flexible bag that is configured to release the stored fuel therein when consumption of the fuel by the fuel cell stack is greater than a supply of the fuel from the external fuel supply container.

The tubing connection further comprises a tube interconnecting the port of the housing and the fuel cell stack, wherein the tube comprises at least one opening coupled with the buffer container so as to form the fluid communication among the port of the housing, the buffer container and the fuel cell stack. The tubing connection may further comprise a first tube interconnecting between the port of the housing and the buffer container, and a second tube interconnecting between the buffer container and the fuel cell stack.

The port of the housing may be configured to open when the external fuel supply container is engaged therewith and further configured to close when the external fuel supply container is disengaged therefrom. The fuel buffer may comprise a rigid fuel buffer housing housed in the fuel cell housing surrounding the buffer container. The fuel cell device may comprise a pump configured to pump fuel from the fuel buffer to the fuel cell stack. The fuel cell stack of the fuel cell device may comprise polymer electrolyte membrane fuel cells (PEMFCs), or direct methanol fuel cells (DMFCs).

BRIEF DESCRIPTION OF THE DRAWINGS

These and/or other embodiments and features will become apparent and more readily appreciated from the following description of certain examples of embodiments, taken in conjunction with the accompanying drawings of which.

DETAILED DESCRIPTION OF EMBODIMENTS

Figure 1A:
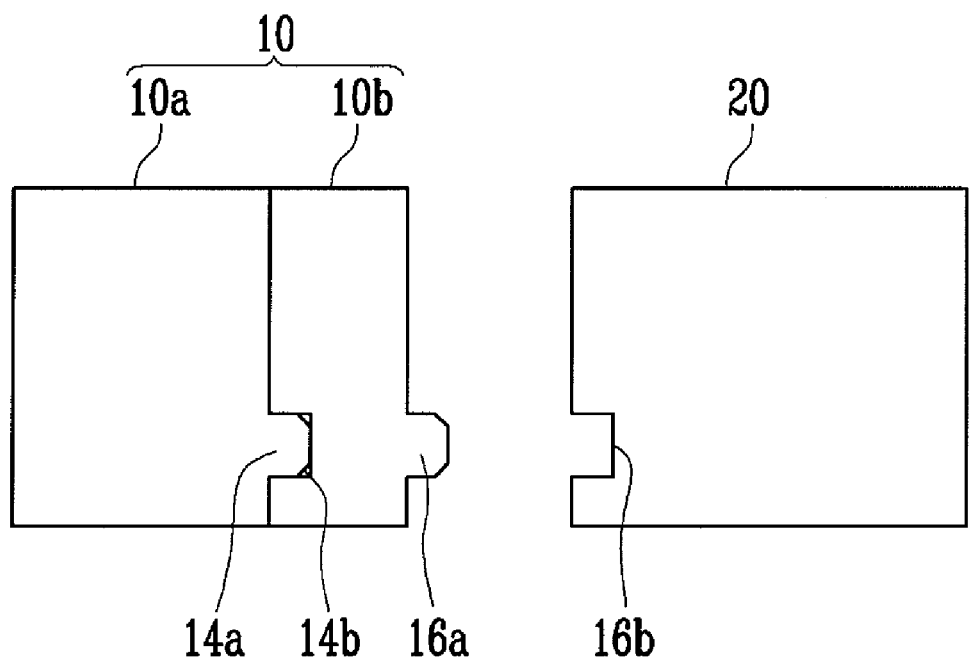
FIG. 1a and FIG. 1b are schematic views illustrating a fuel cartridge having a buffer module according to embodiments of the present disclosure.

Hereinafter, certain exemplary embodiments according to the present disclosure will be described with reference to the accompanying drawings. Here, when a first element is described as being coupled or connected to a second element, the first element may be not only directly coupled to the second element but may also be indirectly coupled to the second element via a third element. Further, elements that are not essential to the complete understanding of the disclosure are omitted for clarity. Also, like reference numerals refer to like elements throughout.

Figure 1B:
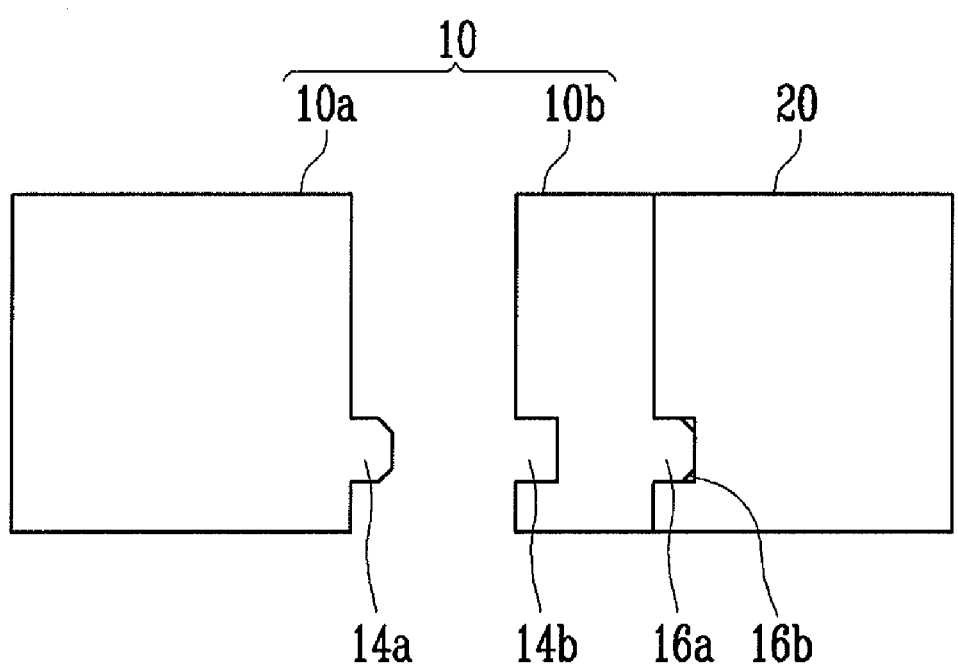

FIG. 1a and FIG. 1b are schematic views illustrating a fuel cartridge having a buffer module according to embodiments of the present disclosure. Referring to FIG. 1a, the fuel cartridge 10 according to the present disclosure includes a fuel container 10a, and a buffer module 10b coupled to the fuel container 10a. The fuel cartridge 10 is coupled to applications such as a fuel cell to supply the stored fuel.

The fuel container 10a has a first port 14a configured to flow fuel therethrough. The fuel container 10a may comprise a rigid container, a buffer (soft) container, and a pressure container. If the fuel container 10a is manufactured as a pressure container, an application to which the fuel cartridge 10 is coupled may be free of a fuel pump installed inside the application.

The buffer module 10b comprises: a second port 14b coupled to the above-mentioned first port 14a; a tubing connection comprising a first and second end, wherein the first end is coupled to or forms the second port and the second end is coupled to or forms the third port The tubing connection will be described in detail, as follow. The above-mentioned buffer module 10b may be configured to be fixed to the fuel container 10a, or configured to be attachable and detachable to the fuel container 10a.

A coupling structure of the fuel container 10a and buffer module 10b may be manufactured so that each of ports in the fuel container 10a and buffer module 10b can be opened when the fuel container 10a and buffer module 10b are coupled or connected with each other and closed when they are decoupled. Also, the fuel container 10a and the buffer 10b module may be manufactured so that they can be protected by separate hard or rigid housing respectively, or protected by one rigid housing. The above-mentioned configurations are apparent to those skilled in the art, and therefore their detailed descriptions and illustrations are omitted for clarity.

The above-mentioned fuel cartridge 10 is coupled to a fuel cell body 20 through a fourth port 16b, as shown in FIG. 1b. Further, the fuel cartridge 10 may be manufactured so that only the fuel container 10a can be detached while the buffer module 10b remains coupled to the fuel cell body 20 while exchanging the fuel container. In this case, the fuel cartridge 10 may be manufactured so that only the fuel container 10a can be exchanged after the initial coupling to its applications. According to the above-mentioned configuration of the fuel cartridge 10, the fuel stored in the buffer module 10b is supplied to the applications (for example, a fuel cell body 20) during a time period required for exchanging the fuel container 10a. Accordingly, there is no need to suspend operations of electronic equipment that uses the applications as a power source, as well as no need to suspend operations of the applications. It is possible to improve the stability and handiness of systems using the fuel cartridge 10 according to the present disclosure.

Figure 2A:
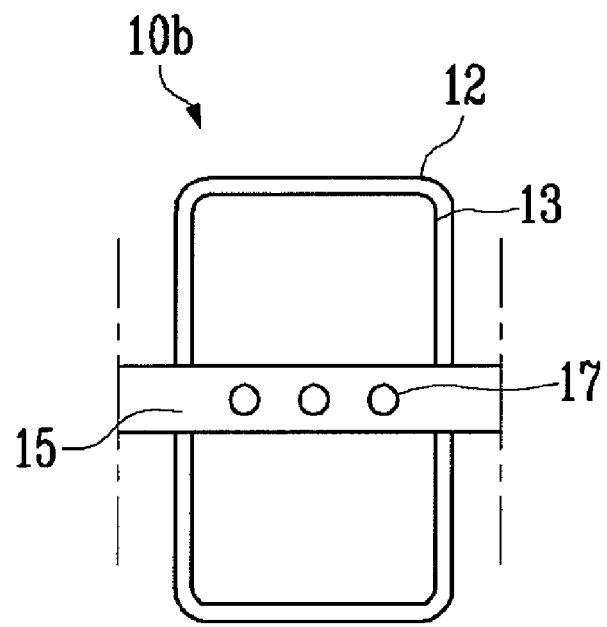
FIG. 2a and FIG. 2b are diagrams illustrating a buffer module of the fuel cartridge according to the present disclosure.
Figure 2B:
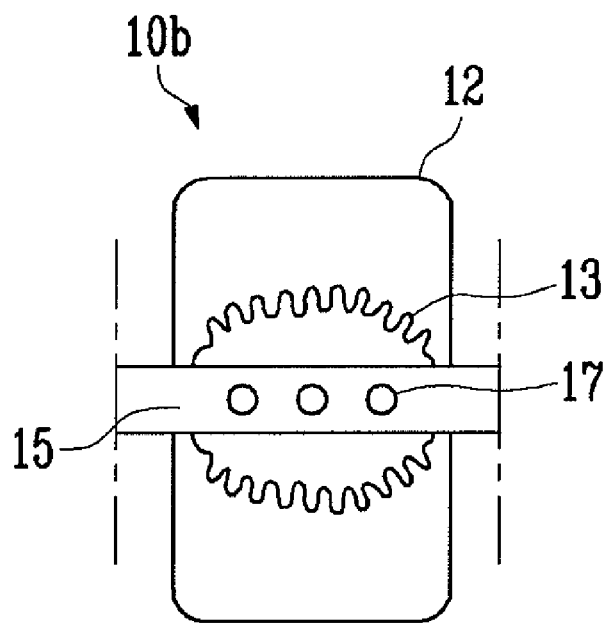

FIG. 2a and FIG. 2b are diagrams illustrating a buffer module of the fuel cartridge as shown in FIG. 1a and FIG. 1b. Referring to FIG. 2a and FIG. 2b, the buffer module 10b of the fuel cartridge according to these embodiments includes a rigid housing 12, a buffer (soft) container 13, and a tubing connection 15.

The rigid container or housing 12 surrounds the buffer container 13 and the tubing connection 15 and protects them. The hard or rigid housing 12 is a housing that can define an expansion range of the flexible buffer container 13 and materials such as woods, metals and plastics may be used for the rigid housing 12.

The flexible or soft container 13 is increased in volume when an inflow of the fuel to the buffer module is greater than an outflow from the buffer module, and returns or decreases in volume when an outflow of the fuel from the buffer module is greater than an inflow to the buffer module. Materials such as flexible bags made of polymeric materials may be used as the elastic buffer container 13.

The tubing connection 15 is coupled between or forms the second port 14b and the third port 16a. At least one opening 17 is provided on tubing connection 15.

For the buffer module 10b of the fuel cartridge according to the present disclosure, the expandable buffer container 13 stores some of the fuel that is passed through the tubing connection 15 during the transfer of fuel from the fuel cartridge, and releases the previously stored fuel into the tubing connection 15 through the opening 17 again when the buffer container 13 is decreased in fuel containing volume with a decreasing pressure of the tubing connection 15 or the buffer 10b in exchanging the fuel cartridge. And, if the internal pressure of the tubing connection 15 is increased by the pressure in the fuel container and a pressure in the above-mentioned applications when the fuel cartridge full of fuel is re-installed, then the buffer container 13 stores some of the fuel passed through the tubing connection 15 again while the expandable buffer container 13 is increased in fuel containing volume with the increasing internal pressure.

Figure 3A:
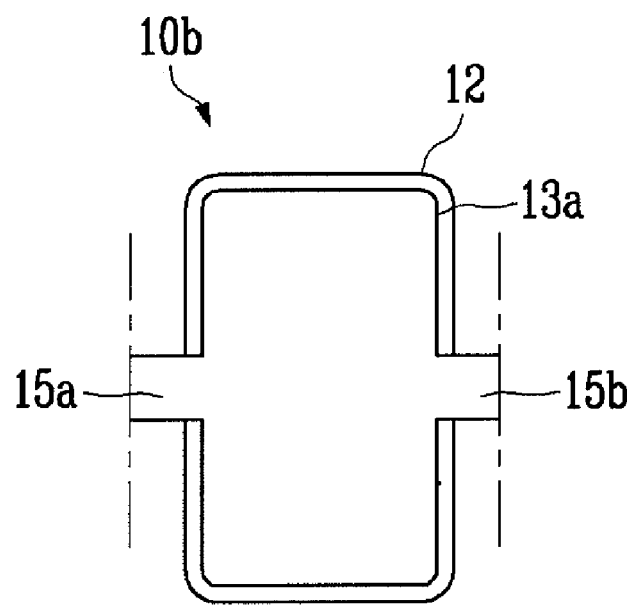
FIG. 3a and FIG. 3b are diagrams illustrating another embodiment of a buffer module of the fuel cartridge according to the present disclosure.
Figure 3B:
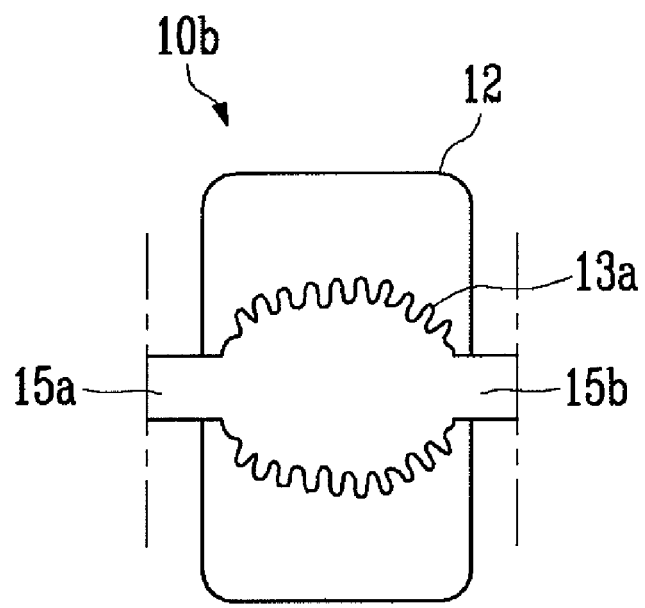

FIG. 3a and FIG. 3b are diagrams illustrating another embodiment of a buffer module of the fuel cartridge as shown in FIG. 1a and FIG. 1b. Referring to FIG. 3a and FIG. 3b, the buffer module 10b of the fuel cartridge according to these embodiments includes a hard or rigid housing 12, a flexible buffer container 13a, a first tube 15a and a second tube 15b.

The buffer module 10b according to these embodiments is substantially identical to the buffer module as described referring to FIG. 2b. However, the buffer module 10b according to these embodiments is different to the buffer module as shown in FIG. 2b in that the buffer module 10b according to these embodiments includes a first tube 15a coupled between the second port 14b, and a port of the buffer container 13a; and a second tube 15b coupled between another port of the buffer container 13a and the third port 16a.

In these embodiments, the flexible buffer container 13a stores some of the fuel flowing through the first tube 15a while it is increased in fuel containing volume in response to the internal pressure applied between the first tube 15a and the second tube 15b during the operation of the fuel cartridge. Also, when the above-mentioned fuel container is detached, the flexible or elastic container 13a releases the previously stored fuel into a third port 16a while it is decreased in fuel containing volume in response to the internal pressure applied to the second tube 15b.

Figure 4:
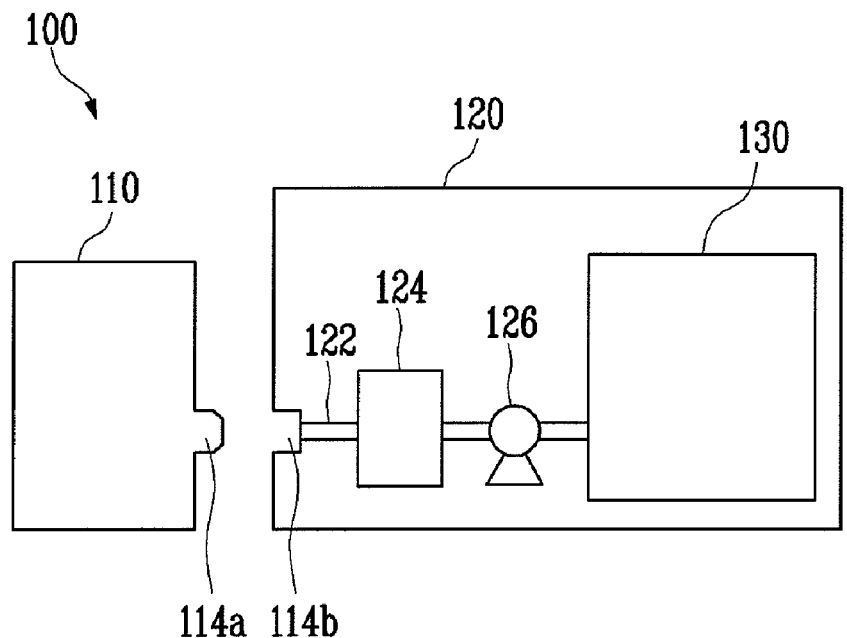
FIG. 4 is a schematic view showing a fuel cell device used for the fuel cartridge according to the embodiments of the present disclosure.

FIG. 4 is a schematic view showing a fuel cell device used for the fuel cartridge according to one embodiment of the present disclosure. Referring to FIG. 4, the fuel cell 100 according to this embodiment includes an external fuel supply container 110, and a fuel cell housing (body) 120 for generating electrical energy by electrochemically reacting oxidants, such as circulating air, with the fuel supplied from the fuel cartridge 110.

The external fuel supply container 110 has a first port 114a configured to flow fuel therethrough. The external fuel supply container 110 corresponds to the fuel container 10a of the fuel cartridge as described previously referring to FIG. 1a or FIG. 1b.

The fuel cell housing 120 includes a fuel buffer 124 and a fuel cell main block 130. The fuel cell main block 130 generates electrical energy by electrochemically reacting separate oxidants with the fuel supplied from the external fuel supply container 110. The fuel cell main block 130 may be realized with the polymer electrolyte membrane fuel cell (PEMFC), or with the direct methanol fuel cell (DMFC).

The fuel buffer 124 is enclosed in the fuel cell housing 120 and coupled to one side of the fuel cell main block 130, and stores some of the fuel supplied from the fuel supply container 110 and supplies the stored fuel to the fuel cell main block 130, if necessary. The above-mentioned fuel buffer 124 corresponds to the buffer module 10b of the fuel cartridge as described before.

Also, the fuel cell housing 120 includes a second port 114b that is configured to be attachable and detachable to the first port 114a for coupling to the external fuel supply container 110. The second port 114b may be coupled to the fuel buffer 124 through the tubing connection 122. Also, the fuel cell body 120 may include a fuel pump 126 coupled between the fuel buffer 124 and the fuel cell main block 130. The fuel pump 126 is configured to pump the fuel stored in the external fuel supply container 110 and/or the fuel buffer 124 to the fuel cell main block 130.

According to the above-mentioned configuration of the fuel cell housing 120, the fuel supply container with the established shape may be used without any modification by installing the fuel buffer 124 with a new configuration in the fuel cell housing 120. In addition, it is possible to rule out back pressure effect by using an elastic or flexible container for a buffer that temporarily stores a fuel, wherein the back pressure prevents smooth transfer of the fuel stored in the fuel cartridge or the fuel supply container in exchanging them.

Figure 5:
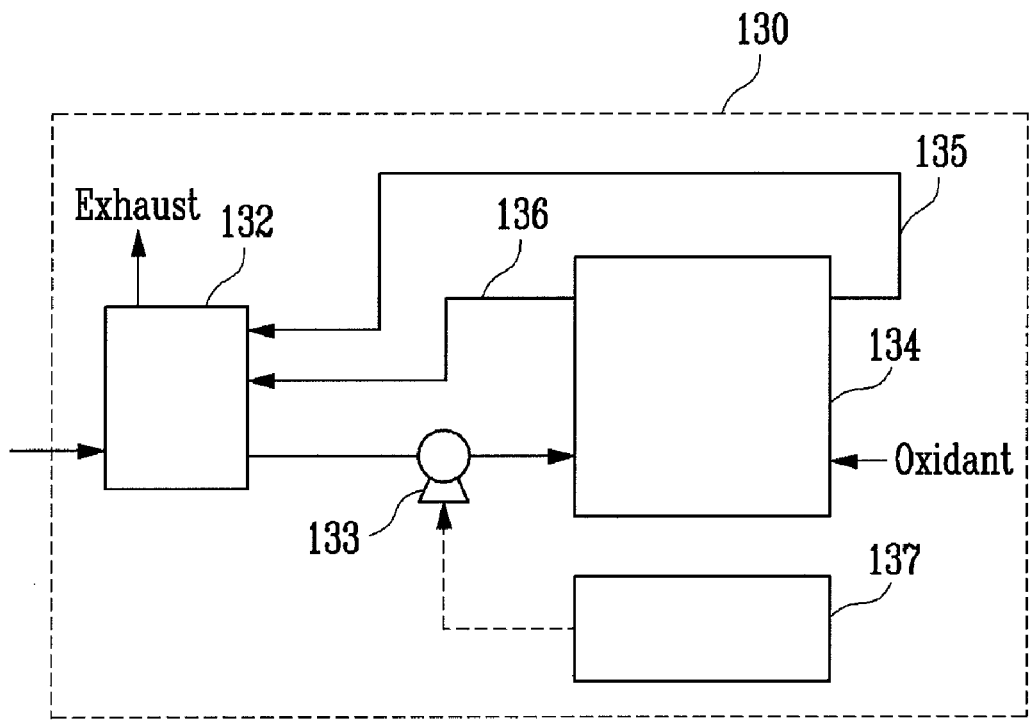
FIG. 5 is a schematic view illustrating a main block of the fuel cell device as shown in FIG. 4.

FIG. 5 is a diagram illustrating a fuel cell main block of the fuel cell housing as shown in FIG. 4. Referring to FIG. 5, the fuel cell main block 130 includes a recycler 132, an infusion pump 133, a fuel cell stack 134, a first pipe 135, a second pipe 136 and a controller 137.

The recycler 132 receives fuel from the fuel cartridge 10 and stores the fuel, receives un-reacted fuel and water from an anode of the fuel cell stack 134 through the first pipe 135 and stores the un-reacted fuel and water, receives un-reacted fuel and water from a cathode of the fuel cell stack 134 through the second pipe 136 and stores the un-reacted fuel and water. The recycler 132 also releases, undesirable gases, for example carbon dioxide, nitrogen, etc., that flow in through the first pipe 135 from the anode and the second pipe 136 from the cathode of the fuel cell stack 134. The above-mentioned recycler 132 may compromise: a mixing tank for recovering, mixing and storing fuel supplied from the external fuel supply container 110 and a reusable fluid received from the fuel cell stack 134; an exhaust unit for releasing undesirable fluid; and a heat exchange means for recycling heat energy in an apparatus.

The infusion pump 133 is coupled between the recycler 132 and the fuel cell stack 134, and supplies the fuel stored in the recycler 132 to an anode of the fuel cell stack 134. The fuel cell stack 134 includes an anode, a cathode, and at least one single cell composed of polymer electrolyte membranes disposed between the anode and the cathode.

The controller 137 controls the infusion pump 133 that supplies fuel to the fuel cell stack 134 in order to provide stable and continuous operation conditions of the fuel cell stack 134. Also, the controller 137 may control a fuel pump that supplies a fuel from the external fuel supply container 110 to the recycler 132. In addition, the controller 137 may control the fuel pump and/or infusion pump 133 in order to adjust concentration of the fuel supplied to the fuel cell stack 134 to a desired concentration range, depending on the various property parameters that affect output properties of the fuel cell stack 134. Here, the property parameters includes at least the information about the concentration of fuel, the temperature of the fuel cell stack 134, the output voltage and output electric current of the fuel cell stack 134, as measured from various sensors installed in the fuel cell main block 130. The above-mentioned controller 137 comprises a logic circuit or microprocessor using a flip-flop.

The fuel cartridge according to the present disclosure has an advantage in that it can provide the continuous and stable operation conditions of the fuel cell by enabling continuous supply of fuel without any suspension of the fuel supply while exchanging a fuel container.

The fuel cartridge according to the present disclosure may be useful in that it may rule out an effect of back pressure by employing a elastic or flexible container for a buffer module that temporarily stores fuel, wherein the back pressure prevents smooth transfer of the fuel stored in the fuel cartridge while exchanging the fuel cartridge, and also to provide the continuous and stable operation conditions of the fuel cell through the continuous fuel supply without any suspension of the fuel supply in exchanging a fuel container.

Although exemplary embodiments of the present disclosure have been shown and described, it would be appreciated by those skilled in the art that changes might be made in these embodiments without departing from the principles and spirit of the disclosure, the scope of which is defined in the claims and their equivalents.

What is claimed is:

1. A fuel cartridge configured for detachable coupling to a fuel cell, comprising:
   a fuel container having a first port configured to flow fuel therethrough; and
   a buffer module detachably coupled to the fuel container, wherein the buffer module comprises:
      a second port detachably engaged with the first port,
      a tubing connection comprising a first and a second end, wherein the first end is coupled to or forms the second port,
      a third port coupled to or formed by the second end of the tubing connection, and
      a buffer container in fluid communication with the second and third ports via the tubing connection, wherein the buffer container is configured to store fuel therein when an inflow of the fuel to the buffer module is greater than an outflow from the buffer module.

2. The fuel cartridge of claim 1, wherein the tubing connection comprises a tube with at least one opening coupled to and in fluid communication with the buffet container.

3. The fuel cartridge of claim 1, wherein the tubing connection comprises a first tube in fluid communication between, the second port and a port of the buffer container, and a second tube in fluid communication between the third port and another port of the buffer container.

4. The fuel cartridge of claim 1, wherein the first port and the second port are configured to open when they are coupled with each other and close when they are decoupled.

5. The fuel cartridge of claim 1, wherein the buffer module has a rigid buffer module housing enclosing the buffer container.

6. The fuel cartridge of claim 1, further comprising a rigid housing enclosing the fuel container and the buffer module.

7. The fuel cartridge of claim 1, wherein the buffer container comprises a flexible bag.

8. The fuel cartridge of claim 1, wherein the buffer container is configured to change a fuel containing volume thereof.

9. The fuel cartridge of claim 8, wherein the fuel containing volume of the buffer container increases when an inflow of the fuel to the buffer module is greater than an outflow from the buffer module.

10. The fuel cartridge of claim 8, wherein the fuel containing volume of the buffer container decreases when an outflow of the fuel from the buffer module is greater than an inflow to the buffer module.

11. The fuel cartridge of claim 1, wherein the buffer container is configured to release the stored fuel therein when an outflow of the fuel from the buffer module is greater than an inflow to the buffer module.

12. A fuel cell, comprising:
   a fuel cell stack comprising an anode, a cathode, and an electrolyte arranged between the anode and the cathode; and
   the fuel cartridge of claim 1 detachably coupled to the fuel cell stack and configured to supply fuel to the fuel cell stack.

13. A fuel cartridge configured for detachable coupling to a fuel cell body, comprising:
   a fuel container having a first port configured to flow fuel therethrough; and
   a buffer module detachably coupled to the fuel container, wherein the buffer module comprises:
      a buffer container configured to store fuel therein when an inflow of the fuel to the buffer module is greater than an outflow from the buffer module,
      a second port configured to engage with the first port,
      a third port configured to engage with a fuel cell, and
      a tubing connection configured to provide fluid communication among the second port, the buffer container and the third port.

14. A fuel cell device, comprising:
   a fuel cell stack comprising an anode, a cathode, and an electrolyte arranged between the anode and the cathode; and
   a fuel cell housing enclosing both the fuel cell stack and a fuel buffer,
   wherein the fuel cell housing comprises a port,
   wherein the fuel buffer comprises a buffer container configured to store fuel and supply the stored fuel to the fuel cell stack,
   wherein a tubing connection provides fluid communication among the port, the buffer container and the fuel cell stack,
   wherein the port is detachably engaged with an external fuel supply container, and
   wherein the buffer container is configured to be detachably connected to the fuel cell stack.

15. The fuel cell device of claim 14, wherein the buffer container is configured to release the stored fuel therein when consumption of the fuel by the fuel cell stack is greater than a supply of the fuel from the external fuel supply container.

16. The fuel cell device of claim 14, wherein the tubing connection comprises a tube interconnecting the port of the housing and the fuel cell stack, wherein the tube comprises at least one opening coupled to the buffer container so as to form the fluid communication among the port of the housing, the buffer container and the fuel cell stack.

17. The fuel cell device of claim 14, wherein the tubing connection comprises a first tube interconnecting between the port of the housing and the buffer container, and a second tube interconnecting between the buffer container and the fuel cell stack.

18. The fuel cell device of claim 14, wherein the port of the housing is configured to open when the external fuel supply container is engaged therewith and further configured to close when the external fuel supply container is disengaged therefrom.

19. The fuel cell device of claim 14, wherein the fuel buffer has a rigid fuel buffer housing housed in the fuel cell housing surrounding the buffer container.

20. The fuel cell device of claim 14, wherein the buffer container comprises a flexible bag.

21. The fuel cell device of claim 14, further comprising a pump in fluid communication with the fuel buffer and the fuel cell stack, wherein the pump is configured to pump fuel from the fuel buffer to the fuel cell stack.

22. The fuel cell device of claim 14, wherein the fuel cell stack comprises polymer electrolyte membrane fuel cells (PEMFCs), or direct methanol fuel cells (DMFCs).

* * * * *

UNITED STATES PATENT AND TRADEMARK OFFICE
CERTIFICATE OF CORRECTION

PATENT NO. : 7,745,034 B2  Page 1 of 1
APPLICATION NO. : 12/130799
DATED : June 29, 2010
INVENTOR(S) : Seong-Jin An et al.

It is certified that error appears in the above-identified patent and that said Letters Patent is hereby corrected as shown below:

At Column 1, Line 45, change "dose" to --does--.

At Column 6, Line 15, change "10" to --110--.

At Column 7, Line 27, in Claim 2, change "buffet" to --buffer--.

At Column 7, Line 30, in Claim 3, change "between," to --between--.

Signed and Sealed this

Seventh Day of December, 2010

David J. Kappos
*Director of the United States Patent and Trademark Office*